United States Patent [19]

Ubukata et al.

[11] 4,180,920
[45] Jan. 1, 1980

[54] ARRANGEMENT TOY FOR SIGNALLING PROPER ARRANGEMENT OF ELEMENTS

[75] Inventors: Morio Ubukata; Hideki Kida, both of Tokyo, Japan

[73] Assignee: Alps Shoji Co., Ltd., Tokyo, Japan

[21] Appl. No.: 862,134

[22] Filed: Dec. 19, 1977

[30] Foreign Application Priority Data

Sep. 6, 1977 [JP] Japan .................. 52-106303

[51] Int. Cl.² ........................... G09B 1/08
[52] U.S. Cl. ............................. 35/9 D
[58] Field of Search ....................... 35/9 D

[56] References Cited

U.S. PATENT DOCUMENTS

| | | | |
|---|---|---|---|
| 3,015,895 | 1/1962 | Stall | 35/9 D X |
| 3,137,079 | 6/1964 | Greuzard | 35/9 D |

Primary Examiner—William H. Grieb
Attorney, Agent, or Firm—Brisebois & Kruger

[57] ABSTRACT

Arrangement toy, including a plurality of elements to be arranged on arrangement areas, comprising a device which judges and indicates whether or not arrangement of the elements are arranged in the arrangement areas in a pre-determined order when a switch is depressed after arrangement of the elements is completed. Each of the elements is provided with a magnet or magnetic substance at a pre-designated position therein.

A plurality of corresponding operative substances are fixed at such positions where the magnets or magnetic substances of the arranging elements are opposed thereto, respectively, when each arranging element is placed in its pre-determined position. The operative substances are provided independent of each other and cooperate with magnets or magnetic substances only when the arranging elements are arranged in the pre-determined order. Such cooperation is communicated to signalling means through withholding means. When the withholding means is released, the signalling means indicates that one or more of the arranging elements are positioned in the pre-determined order.

12 Claims, 17 Drawing Figures

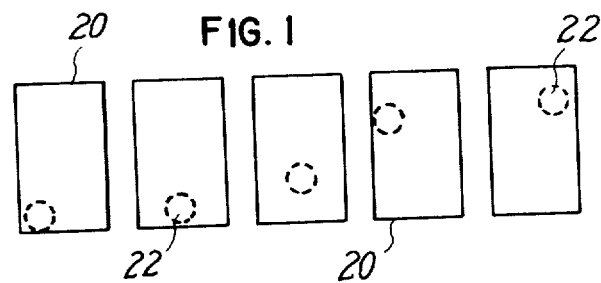
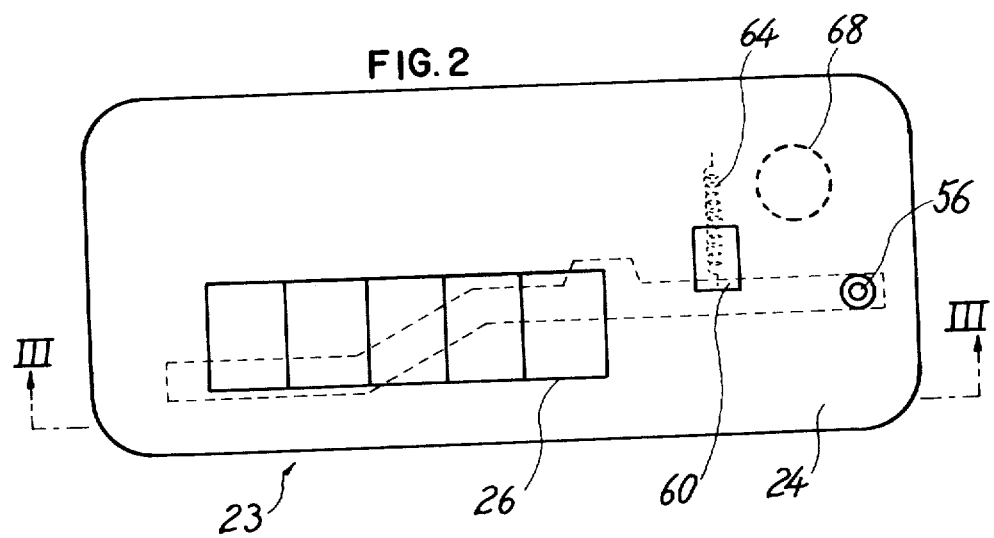
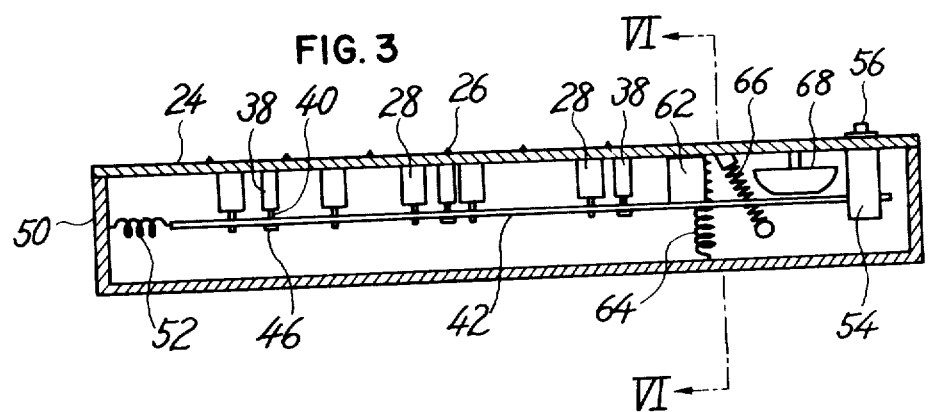

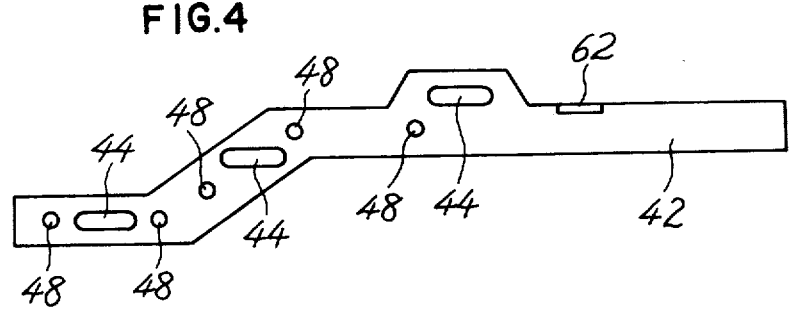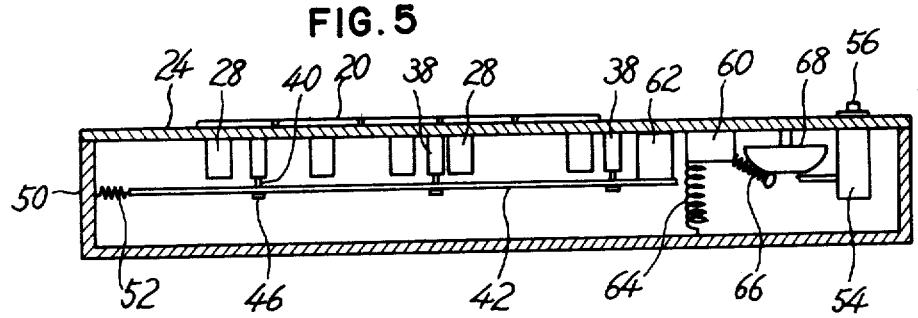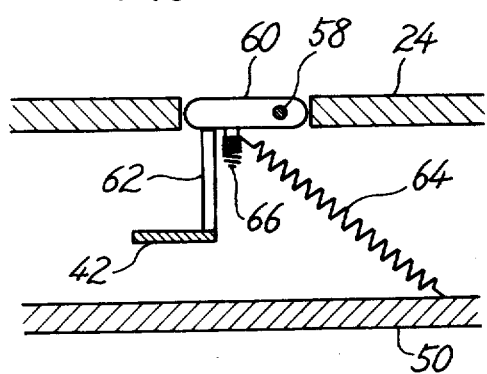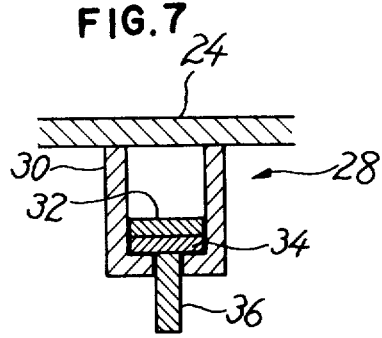

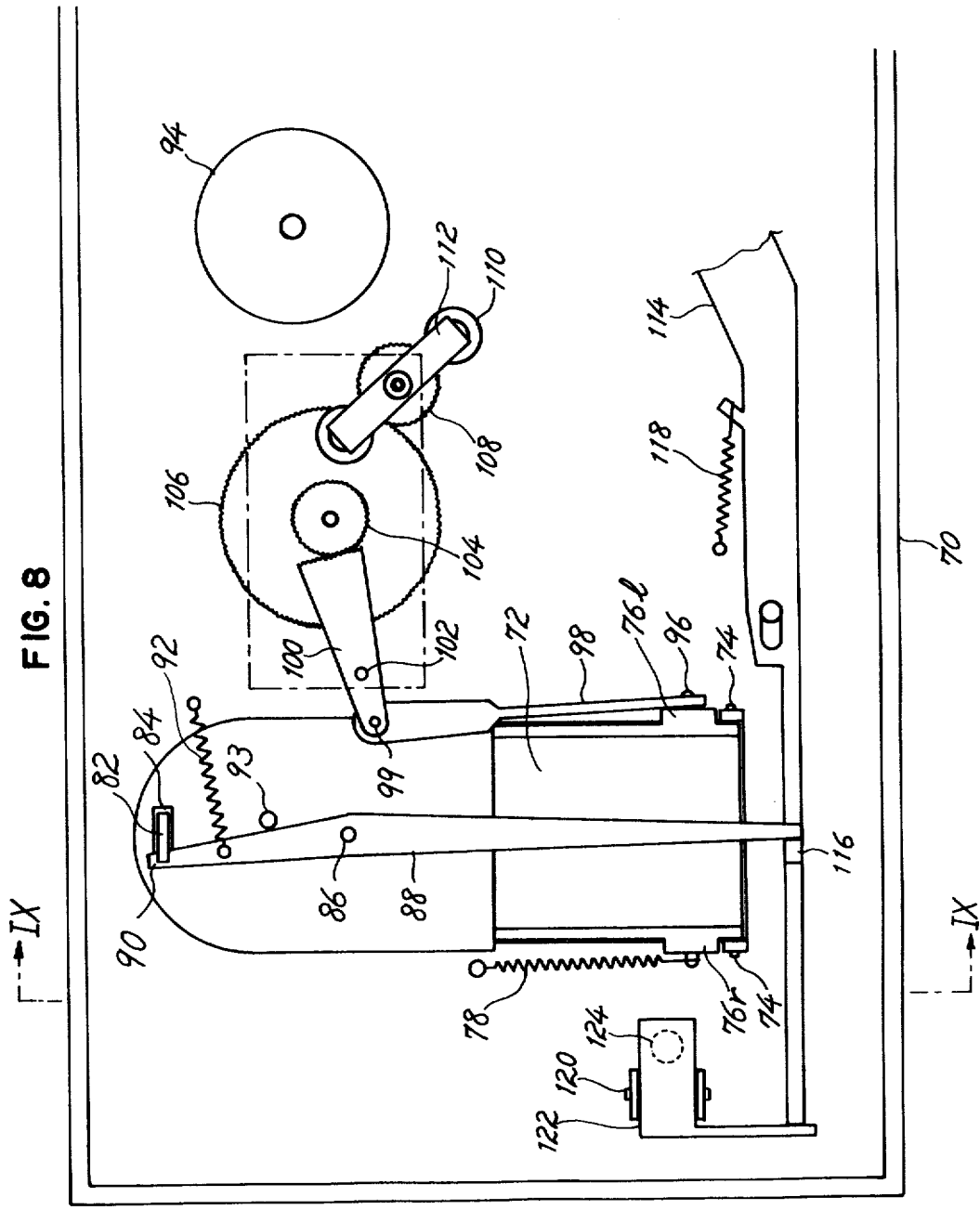

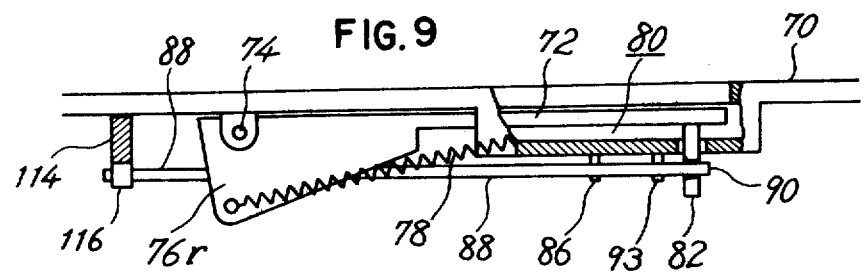
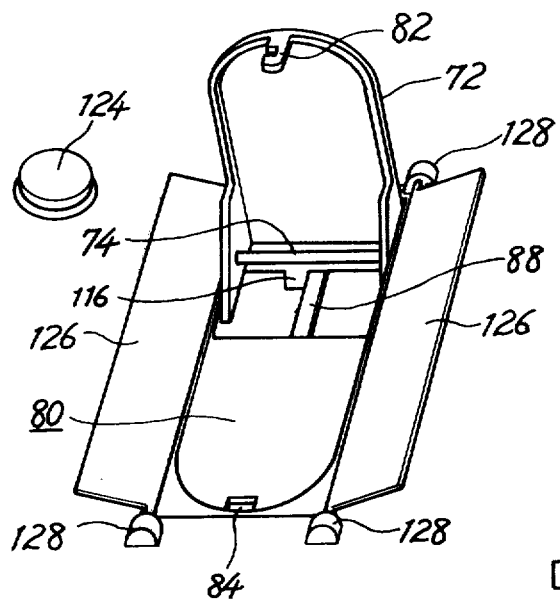
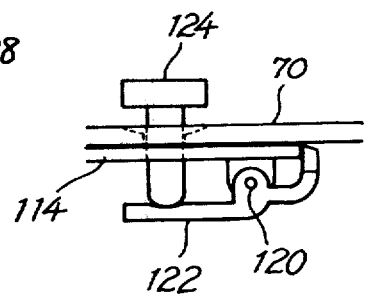

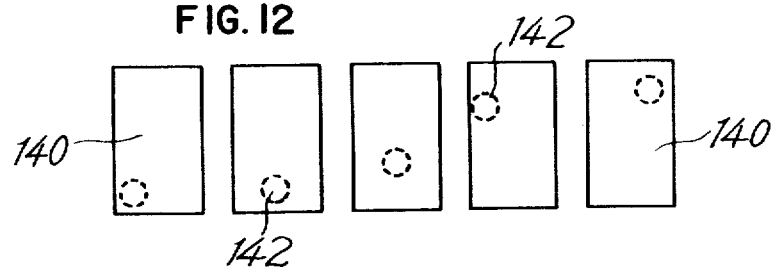
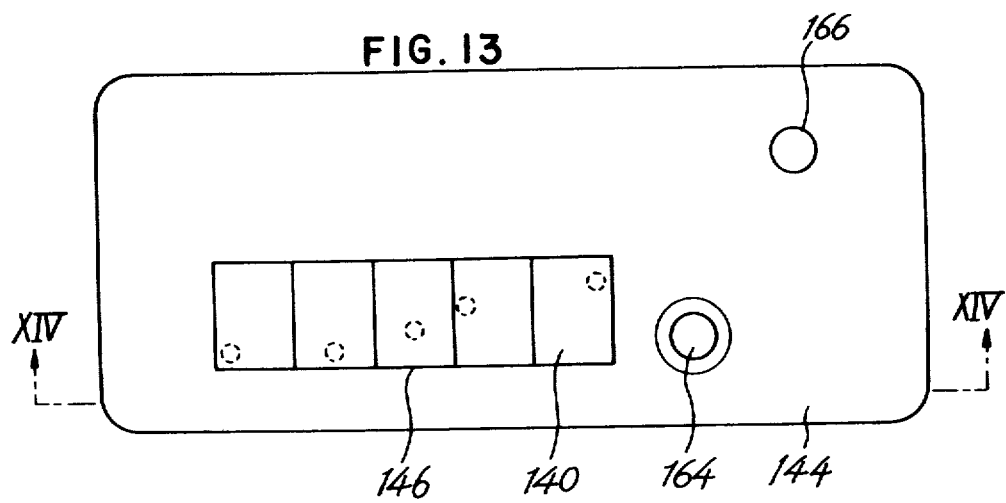
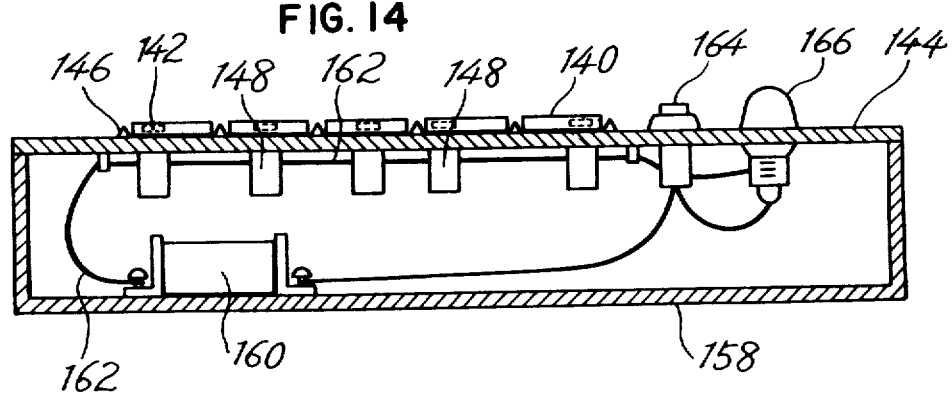

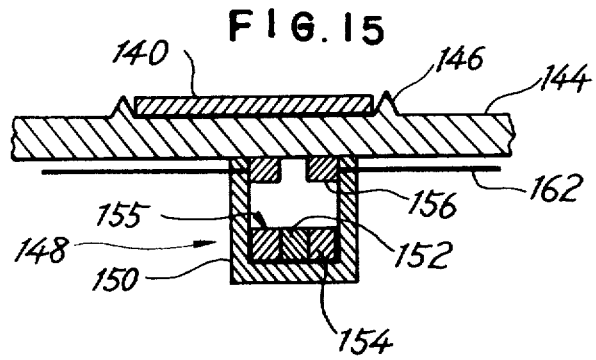
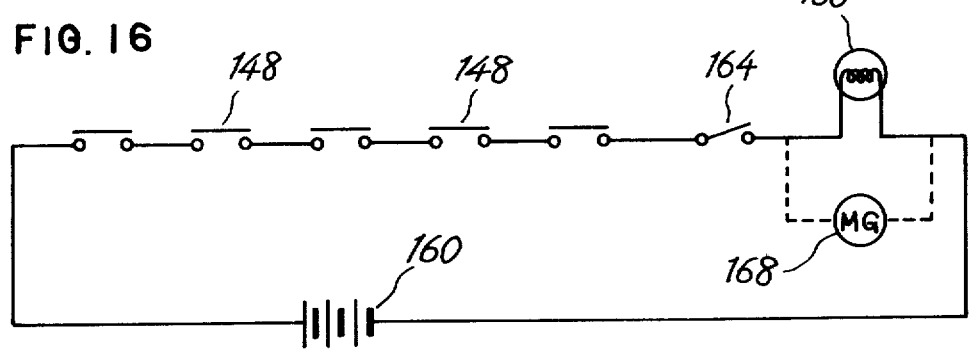
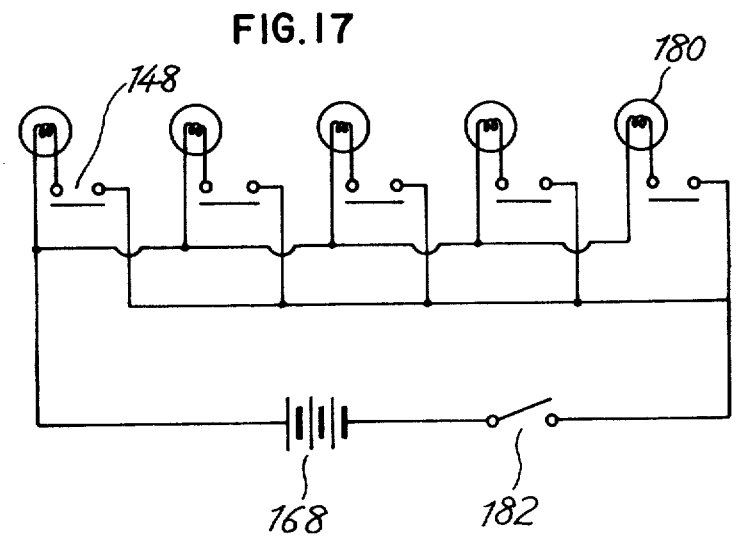

ARRANGEMENT TOY FOR SIGNALLING PROPER ARRANGEMENT OF ELEMENTS

BACKGROUND OF THE INVENTION

The present invention relates to an arrangement toy, more particularly to an arrangement toy suitable for learning the order of alphabets, numerals, shapes and the like.

In a conventional arrangement toy, different letters, for example, alphabets or numerals are indiciated on each of a plurality of cards. The plurality of cards begin and end in merely a combination of letters, pictures and the like, different from each other, illustrated thereon. Children amuse themselves with arranging the cards in a fixed order using their own judgement.

However, such an arrangement toy has a drawback in that an adult, such as one of the child's parents, must assist the child and correct his errors in arrangement of the cards he may make when playing with the toy, since the conventional arrangement toy is not provided with any discrimination device which judges and indicates whether the cards are arranged in the correct order or not. Accordingly, the child cannot play with the toy alone and requires supervision at all times by an adult and is sure to lose interest in the toy within a short time. The manner of playing with the toy is confined to arranging a plurality of cards in a pre-determined order, which is based more on intellectual training than with playing for amusement and therefore, a child is inclined to lose interest in these types of toys since they do not necessarily appeal to him.

SUMMARY OF THE INVENTION

The principal object of the present invention is to provide an arrangement toy equipped with a function which instructs correction of errors for the purpose of intellectual training.

Another object of the present invention is to provide an arrangement toy equipped with a discrimination system by which a child playing with the toy can recognize whether or not the elements (hereinafter referred to as cards) indicating alphabets, numerals, pictures and the like are arranged in a pre-determined order.

A further object of the present invention is to provide an arrangement toy equipped with a function which trains a child's intellectual faculties by allowing him to use his own judgement continuously for the correction of errors.

A still further object of the present invention is to provide an arrangement toy which a child finds amusing while training his judgement of right and wrong.

A still further object of the present invention is to provide an arrangement toy having a mechanism which is simple, safe and durable.

These and many other objects, features and advantages of the present invention will become more apparent as the description proceeds when taken into consideration with the accompanying drawings in which:

BRIEF DESCRIPTION OF THE DRAWINGS

FIGS. 1 to 7 illustrate the first embodiment of the present invention,

FIG. 1 is a plan view of the cards according to this invention;

FIG. 2 is a plan view of the arrangement device;

FIG. 3 is a sectional view taken along the line III—III in FIG. 2;

FIG. 4 is a plan view of the sliding plate;

FIG. 5 is the same sectional view as in FIG. 3 for assistance in explaining the operation of the sliding plate, parts of which are omitted;

FIG. 6 is a sectional view taken along the line VI—VI in FIG. 3;

FIG. 7 is a sectional view of the stopper;

FIGS. 8 to 11 illustrate the second embodiment of the present invention,

FIG. 8 is a bottom view showing the inside of the arranging board;

FIG. 9 is a sectional view taken along the line IX—IX in FIG. 8, parts being broken away;

FIG. 10 is a perspective view of the signalling portion;

FIG. 11 is an elevational view showing the push-button or switch, accordingly to the present invention;

FIGS. 12 to 16 illustrate the third modified embodiment,

FIG. 12 is a plan view of the cards;

FIG. 13 is a plan view of the arrangement device;

FIG. 14 is a sectional view taken along the line XIV—XIV in FIG. 13;

FIG. 15 is a sectional view of the floating relay;

FIG. 16 is a circuit diagram; and

FIG. 17 is a circuit diagram of the fourth embodiment of this invention.

DETAILED DESCRIPTION OF THE PREFERRED EMBODIMENTS

The following examples are included merely to aid in the understanding of the present invention and variations and combinations may be made by one skilled in the art without departing from the spirit and scope of the invention.

FIGS. 1 to 7 show the first embodiment of the invention. An alphabet letter, a numeral, a part of a story or the like is described on the surface of each card 20 shown in FIG. 1, and a magnet 22 is positioned between both surfaces of each card 20 at a pre-determined and different position from other cards 20. The "different position" mentioned above means that the position of each magnet 22 does not fail to shift when the card 20 is rotated in a 90-degree of 180-degree arc, or is turned over from a certain position displaying the opposite surface.

Arranging frames 26, the size of which is the same as the cards 20, are provided in series on the surface of an arranging board 24 of the arrangement device 23 on which the afore-mentioned cards 20 are to be arranged (FIG. 2).

On the reverse side of the arranging board 24, stoppers 28, which lock a sliding plate 42, are so fixed as to oppose each respective magnet 22 provided in the cards 20 with the arranging board 24 therebetween when the cards 20 are placed within the corresponding arranging frame 26 in the pre-determined order. As illustrated in FIG. 7, each of the stoppers 28 includes a cylinder 30, a plastic piston 34, with which magnetic substance 32 contacts, and a piston rod 36 fixed to piston 34. Accordingly, piston 34 is pulled up when the magnet 22, provided in the card 20, is positioned above the stopper 28 with the arranging board 24 therebetween.

Provided that piston 34 has only to be pulled up by the magnetic force operating between magnet 22 and magnetic substance 32, magnetic substance 32 can be replaced by a magnet and magnet 22 may be a magnetic substance if the magnetic substance 32 is changed to a magnet.

Further, a plurality of cylindrical supports 38, the head portions of which are thinly constructed, are fixed on the underside of the arranging board 24. Such a thin-headed portion 40 of each support 38 passes through a slot 44 of the sliding plate 42, and a set flange 46 is fastened at the end thereof. By these means, the sliding plate 42 is supported parallel to the arranging board 24.

The sliding plate 42 is bent at its central portion as shown in FIG. 4, and small holes 48 are so perforated therein 50 that each piston rod 36 of the stoppers 28 can fit thereinto. This sliding plate 42 is placed as mentioned in FIG. 2.

All the slots 44 of the sliding plate 42 are perforated in the same direction, that is, parallel to each other. The sliding plate 42 can be slidably moved to the left side as shown in FIG. 2 by the stroke corresponding to the length of the slots 44 when all the piston rods 36 of stoppers 28 are pulled up and released from the holes 48.

Spring 52, one end of which is secured to a housing 50 of the arrangement device 23, is connected to the left end (in FIG. 3) of the sliding plate 42 and the sliding plate 42 is constantly pulled to the left by this spring 52. On the other hand, the right end of the sliding plate 42 is caught in a brake 54 which has sufficient power to pull the sliding plate 42 against the force of the spring 52, and is released when brake button 56 is pushed.

A rotating plate 60, one edge of which is supported by a rotary shaft 58, is provided in the arranging board 24. The rotating plate 60 is rotably supported by rotary shaft 58 at its one side. Flange 62, which extends from the sliding plate 42, faces the lower edge, opposed to the side of the rotary shaft 58, of the rotary plate 60 for prohibiting rotation of the rotating plate 60. This supporting plate 62 is provided at such a position that support of the rotating plate 60 is released when the sliding plate 42 is moved from its position in FIG. 3 to that shown in FIG. 5, that is, to the left side of these figures.

One end of a spring 64 and a bell striker 66 are secured to the rotary plate 60 at the position between both ends supported by rotary shaft 58 and supporting plate 62. The other end of the spring 64 is secured to the bottom board of the housing 50 and this spring 64 constantly acts on the rotating plate 60 so as to rotate same counterclockwise as shown in FIG. 6. The bell striker 66 is constructed as follows:

Its foundation is made of a metallic tube, a middle spring member and a metallic ball at its end. The bell striker 66 mentioned herein is provided so as to strike and ring a bell 68 fixed near the rotary plate 60 on the underside of the arranging board 24, rotating in a unit with rotary plate 60 which is rotated by spring 64 when the supporting plate 62 slides to the left and releases the rotating plate 60.

The first embodiment of this invention is constituted as above.

Firstly, a player pulls and moved the sliding plate 42 to the right lengthening the spring 52 until the thin head portions 40 of the supports 38 contact the left ends of slots 44 of sliding plate 42 and piston rods 36 of stoppers 38 fit into the small holes 48 and sliding plate 42 is caught in brake 54. In order to move the sliding plate 42, a string (not shown in the drawing) may be tied to the right end of the plate 42 so as to be pulled from the outside by a player.

Next, the player places each card 20 in the arranging frames 26 on the arranging board 24 so that each magnet 22 is opposed to each stopper 28, respectively, with the arranging board 24 therebetween, for example, alphabetically. By correct placement of the cards 20, each piston rod 36 of each stopper 28 is lifted by the magnetic force of magnets 22 provided in respective cards 20 as all the cards 20 are arranged in a pre-determined order. The sliding plate 42 is prevented from sliding to the left only by the braking force of brake 54 when piston rods 36 of stoppers 28 are lifted and withdrawn from the holes 48 of the sliding plate 42. When the brake button 56 is pushed, the sliding plate 42 moves to the left by the force of spring 52 due to the fact that brake 54 releases the sliding plate 42. Provided that the stroke of the sliding plate 42 is limited to the distance corresponding to the length of the slots 44, the thin headed portions 40 of the support 38 pass through the slots 44 of sliding plate 42, respectively. When the sliding plate 42 is moved, the supporting plate 62 secured thereto releases the locking of rotary plate 60 and thereafter, as the rotary plate 60 is rotated by the force of spring 64 and the bell striker 66 strikes the bell 68, correctness of the child's arranging of the cards 20 is indicated thereby.

Even if only one of the cards 20 is arranged in a wrong position or order, this indicates that the stopper 28 is not correctly opposed to the magnet 22 of the card 20 arranged incorrectly. Accordingly, the piston rod 36 is not pulled up and remains in the hole 48 of sliding plate 42. That is, even if the other four cards 20 are arranged correctly and the piston rods 36 are free from the holes 48 and further, the brake button 56 has been pushed in an attempt to release the sliding plate 42, the sliding plate 42 cannot be moved due to the fact that one of the cards has been placed incorrectly thereby disallowing its piston rod 36 to be pulled up by magnetic force. Therefore, the arrangement of one or more cards is found to be incorrect when the bell 68 does not ring.

The second modified embodiment of this invention will be explained hereinafter.

In the following embodiment, communicating means which communicates the discrimination by discriminating means, signalling means which indicates a communicated signal from the communicating means and withholding means of communication, differ from those of the afore-mentioned first embodiment.

FIG. 8 shows the underside of the arranging board 70.

Signal plate 72 is supported by rotary shaft 74 provided at the underside of the arranging board 70. As is clearly illustrated in FIG. 9, same shows the state wherein the signal plate 72 is in its reclining position in parallel with the surface of the arranging board 70 prior to the signalling system being activated. The signal plate 72 centrally rotates around the rotary shaft 74 and rises to a vertical position at almost a right angle to the arranging board 70 as shown in FIG. 10. A pair of protruding plates 76r and 76l extend at right angles from the reverse side of the signal plate 72.

One end of spring 78 is secured near the bottom end of the protruding plate 76r, the other end of spring 78 is secured to the underside of the arranging board 70 and the spring 78 pulls the protruding plate 76r so as to force the signal plate 72 into an upright position. When not activated, the signal plate 72 remains in a concave bay 80 having the same shape as the signal plate 72. U-shaped hook 82 is formed at the upper end of the signal plate 72 for holding the signal plate 72 in the concave bay 80. Hook 82 protrudes from the reverse side of the concave bay 80 and passes through a small rectangular hole 84 perforated in the bottom of the bay 80. Locking end 90 of lever 88, which centrally rotates around a supporting shaft 86 secured to the reverse side of the bay 80, contacts with and is secured by the notch of hook 82, thereby tightly locking the signal plate 72.

Spring 92 constantly pulls the locking end 90 in the right direction and works to maintain the locking condition by the hook 82. Reference numeral 93 indicates a protruding stopper which limits the angle of rotation of the lever 88.

The means provided for ringing the bell 94 will be described below.

One end of a rod 98 is connected to a projection 96 projecting at the edge of protruding plate 76l and the other end is connected to a partial gear 100 through connecting bar 99. Accordingly, the motion which rotates the partial gear 100 is smoothly transmitted, but, however, the projection 96 may be lifted when the signal plate 72 rises, since the projection 96 is formed parallel to the rotary shaft 74 and supports the rod 98 by its free rotation.

The partial gear 100 is in engagement with gear 104, which centrally rotates around shaft 102. Gear 106 is fastened to the same shaft as gear 104, having more teeth than gear 104. Gear 108, in engagement with gear 106, has a lesser number of engaging teeth than gear 106. Rotary bar 112 provided with two bell strikers 110 is fixed to the gear shaft of gear 108. The bell strikers 110, attached to both ends of the rotary bar 112, have play in their movement. The bell strikers 110 do not strike the bell 94 when not rotated, but extend outwardly to hit and ring same by centrifugal force when rotated.

The other end of lever 88 contacts projection 116 of sliding plate 114 and is pushed to rotate to the right by the projection 116 when the sliding plate 114 moves in the same direction and spring 118 pulls the sliding plate 114 to the left.

The sliding means for sliding plate 114, that is, the operating means for the signalling means will be explained hereinafter.

In FIG. 11, L-shaped plate 122 is supported by shaft 120 attached to the underside of the arranging board 70 at its central portion. The whole body of L-shaped plate 122 is so formed, that its one end pushes the sliding plate 114, which moves in a different direction from that of the stroke of push-button 124, by 90-degrees when the other end of L-shaped plate 122 is pushed by push-button 124.

The manner of operation of the above-described second embodiment will be explained hereunder.

If the cards are arranged in the arranging frame 26, for instance, alphabetically, so that the magnets 22 oppose stoppers 28 with the arranging board 70 therebetween, each piston rod 36 of each stopper 28 is pulled up by the force of each magnet 22 provided in each card 20. In the state where the piston rods 36 are pulled up and drawn out of the holes (not illustrated) of sliding plate 114, the sliding plate 114 remains in its stationary position due to the pulling force of spring 118 and does not slide. Next, when the push button 124 is pushed, the push direction is changed by 90-degrees by means of the L-shaped plate 122 which operates to push the sliding plate 114 to the right (in FIG. 8). At this time, the sliding plate 114 slidably moves with the spring 118 lengthening and projection 116 pushes one end of lever 88 to rotate same so that reverse locking end 90 is released from hook 82 of signal plate 72.

As the spring 78 pulls the protruding plate 76r, the signal plate 72, supported by the rotary shaft 74, raises up, jumps out of the bay 80 and protrudes above the arranging board 70 at almost a right angle to same.

Numeral 126 in FIG. 10 denotes a pair of flaps which cover the signal plate 72 on both sides of the bay 80 when the signal plate 72 is laid therein. These flaps 126, supported by two pairs of bearings 128 formed on the arranging board 70, respectively, are pushed open when the signal plate 72 springs out of the bay 80. Accordingly, in the case where a particular design or picture is made on the signal plate 72, the picture or design cannot be seen since it is hidden by the flaps 126, but when the flaps 126 are opened by the pushing of the signal plate 72 when the push button 124 is pushed, the signal plate 72 stands up showing that the arrangement of the cards 20 have been placed in their pre-determined order and the player can see the picture or design on the signal plate 72.

On the other hand, the protruding plate 76l pushes the rod 98 simultaneously when the protruding plate 76r is pulled by spring 78 when signal plate 72 stands up, which motion is communicated to and at the same time rotates the partial gear 100. Thereby, the gear 104 and gear 106 begin to rotate as a unit. The gear 108 is rotated at a comparatively high speed due to the gear ratio between gear 106 and gear 108 engaged together being large, in spite of the fact that the motion of partial gear 100 and gear 104 is slight. Accordingly, rotary rod 112 is rotated simultaneously with the gear 108 and the bell striker 110 strikes the bell, ringing same.

When the push button 124 is pushed in the case where the cards 20 are arranged in the pre-determined order, the signal plate 72 springs out of the bay 80 pushing the flaps 126 open and the bell 94 rings simultaneously with this action. Of course, it is not always necessary to equip the toy with both such two-channel signalling means and it is possible to select either one or the other.

In order to return the signal plate 72 back into plate after it has sprung out of the bay 80, it is sufficient only to push the signal plate 72 into the bay 80 and shut the flaps 126 by hand.

If stated in detail, when the push button 124 is released, the sliding plate 114 is pulled back to the initial position (to the left in FIG. 8) by force of spring 118 and the lever 88 is also pulled back to the stopper 93 by spring 92. Thereupon, the signal plate 72 is locked in place when it is pushed back into the bay 80 when the hook 82 projecting through the rectangular hole 84 locks with its U-shaped notch catching the locking end 90. The stopper 93 is provided at such a position so that the lever 88 can be stopped from moving in order to easily engage the locking end 90 with the end of hook 82.

Contrary to the above, in the case where a card 20 is arranged in the wrong order or direction, the piston rod 36 cannot be lifted nor can it slip out of the small hole of the sliding plate 114 due to the fact that the magnet 22 in the card 20 is not positioned opposite the stopper 28. Accordingly, sliding plate 114 remains locked by one or more stoppers 28 and cannot slide and therefore, nothing responds to the pushing of push button 124.

Next, the third embodiment of the present invention will be explained.

FIG. 12 shows cards 140 to be arranged, in which magnets 142 are provided at different positions, respectively. Such expression as "at different positions" is to be understood as defined in the explanation of the above-mentioned first embodiment.

Arranging frame 146, the size of which is the same as that of the cards 140, is provided in series on the surface of the arranging board 144 on which cards 140 are to be arranged. The size of the arranging frame 146 corresponds to that of the cards 140 so that the cards 140 fit therein in close contact with each other.

On the underside of the arranging board 144, floating relays 148 are so fixed that they oppose the magnets 142 provided in cards 140 with the arranging board 144 therebetween when the cards 140 are arranged in the arranging frame 146, respectively, in the predetermined order. Floating relay 148 is constructed as illustrated in FIG. 15. That is, floating contact 155, which comprises a copper disc 154 and magnetic substance 152 at its central portion, is stored in a cylinder 150 and the floating contact 155 floats within the cylinder 150. Further, two fixed contacts 156 for connection of the floating relay 148 are provided on the underside of the arranging board 144 in the cylinder 150.

The floating contact 155 is lifted up by the force of the magnet 142 for contact with both fixed contacts 156 when such floating contact 155 opposes the magnet 142 provided in the card 140 with the arranging board 144 therebetween. Hence, the floating relay 148 closes the circuit while the floating contact 154 is in contact with the fixed contacts 156.

The electric circuit of the above-mentioned embodiment will now be explained in detail.

In FIGS. 14 and 16, a dry cell battery 160 is positioned at the bottom of case 158 which supports the arranging board 144. A line 162 from the positive pole of the battery 160 is led to switch 164 through all the floating relays 148. Such switch 164 is a make contact-type switch that remains open. Pilot lamp 166 is located between switch 164 and the negative side of dry cell battery 160, which pilot lamp 166 lights while switch 164 is closed when all the floating relays 148 are closed. Furthermore, it is possible to connect an electromagnet 168, as shown by a dotted line in FIG. 16 and to ring the bell or activate any other type of signalling device in lieu of the pilot lamp 166.

The third modified embodiment of this invention is constituted as stated above.

In the case of an example where the cards 140 are arranged, for instance, alphabetically, floating relays 148 must be so provided that they oppose the magnets 142 with the arranging board 144 therebetween when the cards 140 are arranged in each arranging frame 146 alphabetically and in a pre-determined order. Then, each of the floating contacts 155 of respective floating relays 148 is pulled up by the force of each magnet 142, included in the respective cards 140, and contact the fixed contact 156, thereupon, each of the floating relays 148 closes, provided that all of the cards 140 have been arranged in the pre-determined order. When switch 164 is pushed in the above-mentioned situation, pilot lamp 166 lights to indicate that the arrangement is correct. In the case that the electromagnet 168 is used instead of the aforementioned pilot lamp 166, the electromagnet 168 is energized to ring the bell or the like signal when all of the cards 140 have been arranged in the pre-determined order.

On the other hand, when even one of the cards 140 is arranged in the wrong position, the magnet 142 of card 140 is also arranged wrongly and does not oppose its respective floating relay 148. Consequently, the floating relay is not able to work and the pilot lamp 166 does not light.

The fourth modified embodiment of the present invention will now be described.

In this embodiment, structure of the cards, position of the arranging frame on the arranging board and structure and relative fixed positions of the floating relays are the same as or similar to those of the third embodiment. However, the connection of the pilot lamps is not in series, but in parallel. A definite example of the electric circuit is illustrated in FIG. 17. That is, the pilot lamps 180 are so provided as to correspond to each card so that lighting of each lamp 180 should be limited to the lamp corresponding to the card having been arranged in the pre-determined order. Therefore, simultaneously with the cards 140 being placed in the arranging frame 146, the arrangement of the cards 140 turns out to be correct when switch 182 is closed prior to placing the cards 140 in the arranging frame 146. On the other hand, after arranging the cards 140 with switch 182 open, the card that has been placed incorrectly is located when switch 182 is closed and the lamp 180 corresponding to the incorrectly placed card 140 does not light.

In the case where conception of the fourth embodiment is adapted in the afore-mentioned first, second or third embodiment, which card has been arranged in the wrong position or order can be ascertained immediately.

In order to adapt the first or second embodiment, it is necessary for the piston 34 of stopper 28 to be changed to floating contact 155 in the third embodiment and fixed contact 156 should be provided.

It is possible to fix and is not necessary to shift the position of the stopper 28 or floating relay 148 each time when the position of the magnet 142 is different from each other among a group of alphabetical cards and the position is the same as that of a corresponding card in another group.

Consequently, even a child can learn to operate the arrangement toy and at the same time learn the order of alphabets, numerals, words and the like and such training apparatus can be utilized for various kinds of study.

As many apparently widely different embodiments of this invention may be made without departing from the spirit and scope thereof, it is to be understood that the invention is not limited to the specific embodiments thereof except as defined in the appended claims.

What is claimed is:

1. An arrangement toy comprising:
   (a) a plurality of arranging elements including magnets or magnetic substances located at their particular positions, respectively;
   (b) an arrangement device having means for arrangement of said elements at pre-determined positions on the surface of an arranging board;
   (c) discrimination means for discriminating the order of said arranging elements and comprising, a plurality of operative substances which operate in combination with said magnets or magnetic substances and are respectively provided at such positions on the underside of said arranging board that each of said operative substances oppose said magnet or magnetic substance of each arranging element when each of said arranging elements is placed at its pre-determined position on said arranging board in a pre-determined order, said operative substances being in cooperation with said magnets or magnetic substances independent of each other when respective magnets or magnetic substances in said arranging elements oppose said corresponding operative substances with said arranging board therebetween and, said operative substances being out of cooperation with said magnets or magnetic substances, respectively, when any of said magnets or magnetic substances do not oppose its corresponding operative substance with said arranging board therebetween;

(d) communication means for communicating the effect attained by said discrimination means; and (e) notification means notifying the effect communicated by said communication means;

each of said operative substances of said discrimination means including an operative substance capable of sliding up and down in a cylinder;

and wherein, said operative substances comprise magnetic substances when said arranging elements comprise magnets, and said operative substances comprise magnets when said arranging elements comprise magnetic substances.

2. An arrangement toy as defined in claim 1, wherein said notification of the effect communicated by said communication means is temporarily withheld by withholding means.

3. An arrangement toy as defined in claim 1, wherein said communication means communicates the discriminated effect when all of said operative substances of said discrimination means are in cooperation with said corresponding magnets or magnetic substances, respectively.

4. An arrangement toy as defined in claim 1, wherein said communication means, particularly provided with said discrimination means including said operative substances which are in cooperation with corresponding magnets or magnetic substances, respectively, of said arrangement elements, is made to communicate the discriminated effect independent of other communication means.

5. An arrangement toy as defined in claim 1, wherein said operative substances are magnetic substances and said arranging elements include magnets.

6. An arrangement toy as defined in claim 1, wherein said arranging elements are cards in which magnets are provided, respectively.

7. An arrangement toy as defined in claim 1, wherein said means for arrangement of said cards includes a plurality of frames, the size of which are suitable for said cards, provided in series.

8. An arrangement toy as defined in claim 1, wherein said communication means comprises:

(a) a plurality of piston rods extending from a lower surface of each of a plurality of pistons on each of which said operative substance is secured;

(b) a sliding plate having a plurality of holes into which each of said piston rods fits, while said piston remains inactive, and out of which each of said piston rods moves in order to be in a free condition when pulled up and a plurality of slots perforated parallel to each other in said sliding plate;

(c) two or more supports supporting said sliding plate, each of which pass through said slot of said sliding plate at its thin head portion and is provided with a set flange at its end; and (d) means for pulling said sliding plate in a fixed direction.

9. An arrangement toy as defined in claim 1, wherein said communication means further comprises:

(a) a plurality of piston rods extending from the lower surface of each piston on which an operative substance is secured, said piston rods being capable of sliding up and down within each cylinder;

(b) a sliding plate having a plurality of holes into which each of said piston rods fits while said piston remains inactive and out of which each of said piston rods moves in a free condition when pulled up, and a plurality of slots perforated parallel to each other in said sliding plate;

(c) two or more supports supporting said sliding plate, each of said supports passes through said slot of said sliding plate at said support's thin head portion and said supports are provided with a set flange at respective lower-end portions thereof;

(d) means for pushing said sliding plate in the fixed direction when all of said piston rods slip out of respective holes in said sliding plate; and (e) a lever communicating with said notification means, one end of which is pushed by said sliding plate to rotate when said sliding plate is slid by said pushing means.

10. An arrangement toy as defined in claim 9, wherein said notification means includes a signal plate supported by a supporting shaft and is forcibly raised by a secured spring released from a locked state when said lever is rotated.

11. An arrangement toy as defined in claim 10, wherein said notification means includes a bell striking device comprising:

(a) a bell;

(b) a rotary bar, both ends of which are provided with bell striking means;

(c) gearings transmitting rotation to said rotary bar;

(d) a partial gear rotating said gearings;

(e) a pair of plates protruding at both sides of said signal plate; and (f) a joining rod transmitting rotating motion to said partial gear when one of said protruding plates rises simultaneously with said signal plate.

12. An arrangement toy comprising:

(a) a plurality of arranging elements including magnets or magnetic substances located at their particular positions, respectively;

(b) an arrangement device having means for arrangement of said elements at pre-determined positions on the surface of an arranging board;

(c) discrimination means for discriminating the order of said arranging elements and comprising, a plurality of operative substances which operate in combination with said magnets or magnetic substances and are respectively provided at such positions on the underside of said arranging board that each of said operative substances oppose said magnet or magnetic substance of each arranging element when each of said arranging elements is placed at its pre-determined position on said arranging board in a pre-determined order, said operative substances being in cooperation with said magnets or magnetic substances independent of each other when respective magnets or magnetic substances in said arranging elements oppose said corresponding operative substances with said arranging board therebetween and, said operative substances being out of cooperation with said magnets or magnetic substances, respectively, when any of said magnets or magnetic substances do not oppose its corresponding operative substance with said arranging board therebetween;

(d) communication means for communicating the effect attained by said discrimination means; and (e) notification means notifying the effect communicated by said communication means;

and wherein said communication means includes devices which respectively comprise:

(f) a pair of fixed contacts provided at an upper member inside a respective cylinder, each of said devices being separated from one another;

(g) a floating relay including a copper discoidal floating contact floating up and down in its cylinder, a central portion thereof comprising said operative substance;

and wherein said operative substances comprise magnetic substances when said arranging elements comprise magnets, and said operative substances comprise magnets when said arranging elements comprise magnetic substances.

* * * * *